(12) United States Patent
Wang et al.

(10) Patent No.: US 11,633,904 B2
(45) Date of Patent: *Apr. 25, 2023

(54) LONG PLASTIC LAYER WITH EMBOSSING IN REGISTER WITH PATTERN AND ROLLING METHOD AND DEVICE THEREFOR

(71) Applicant: FLOORING INDUSTRIES LIMITED, SARL, Bertrange (LU)

(72) Inventors: Yibing Wang, Huzhou (CN); Wenjin Tang, Huzhou (CN); Caiqin Zhu, Huzhou (CN)

(73) Assignee: FLOORING INDUSTRIES LIMITED, SARL, Bertrange (LU)

(*) Notice: Subject to any disclaimer, the term of this patent is extended or adjusted under 35 U.S.C. 154(b) by 264 days.

This patent is subject to a terminal disclaimer.

(21) Appl. No.: 15/270,738

(22) Filed: Sep. 20, 2016

(65) Prior Publication Data

US 2017/0361521 A1    Dec. 21, 2017

Related U.S. Application Data

(63) Continuation of application No. PCT/CN2016/088034, filed on Jun. 30, 2016.

(30) Foreign Application Priority Data

Jun. 15, 2016  (CN) .......................... 201610421191.8

(51) Int. Cl.
*B29C 59/04* (2006.01)
*B32B 38/00* (2006.01)
(Continued)

(52) U.S. Cl.
CPC ............ *B29C 59/04* (2013.01); *B29C 59/046* (2013.01); *B32B 38/06* (2013.01);
(Continued)

(58) Field of Classification Search
CPC .......................... B29C 59/046; B32B 37/0053
See application file for complete search history.

(56) References Cited

U.S. PATENT DOCUMENTS 2,831,097 A * 4/1958 Malewski ............... B41F 13/22
                                                   219/470
3,024,154 A * 3/1962 Singleton .............. B29C 59/046
                                                   156/209

(Continued)

FOREIGN PATENT DOCUMENTS

CN           1420025 A     5/2003

*Primary Examiner* — Andrew D Graham
(74) *Attorney, Agent, or Firm* — Workman Nydegger

(57) ABSTRACT

A long plastic layer with an embossing in register with a pattern, a rolling method and a device are described herein. The method comprises a feeding step of feeding a plastic layer into oppositely rolling rollers; and a rolling step of hot rolling an embossing on the plastic layer. A feeding tension of the plastic layer is adjusted according to a longitudinal deviation between the embossing and the pattern in the rolling step. The device comprises a first feeding device, an oppositely rolling rollers control device, a detecting device, and a tension controller disposed on the first feeding device. According to the long plastic layer with the embossing in register with the pattern manufactured by the method, the embossing on the plastic layer is in register with the pattern on the plastic layer. The present invention provides the method, the device and the long plastic layer with the embossing in register with the pattern processed using the method, implementing the embossing rolled on the plastic layer in register with the pattern on the plastic layer and having high production efficiency, low cost and less energy consumption.

13 Claims, 6 Drawing Sheets

(51) Int. Cl.
  *B32B 38/06* (2006.01)
  *B29L 31/00* (2006.01)
  *B29L 7/00* (2006.01)
  *B32B 41/00* (2006.01)

(52) U.S. Cl.
  CPC ..... *B32B 38/1875* (2013.01); *B29L 2007/002* (2013.01); *B29L 2031/722* (2013.01); *B32B 2041/04* (2013.01)

(56) References Cited

U.S. PATENT DOCUMENTS

| | | | | |
|---|---|---|---|---|
| 3,196,062 A * | 7/1965 | Kristal | ........... | B32B 37/00 156/79 |
| 3,471,354 A * | 10/1969 | Scofield | ........... | B29C 59/046 425/370 |
| 3,741,851 A * | 6/1973 | Erb et al. | ........... | B32B 3/30 428/161 |
| 3,953,639 A * | 4/1976 | Lewicki, Jr. | ........... | B29C 44/26 428/160 |
| 3,959,567 A * | 5/1976 | Bradley | ........... | B29C 43/305 428/461 |
| 4,069,081 A * | 1/1978 | Drower | ........... | B32B 37/0053 156/273.3 |
| 4,105,491 A * | 8/1978 | Haase | ........... | B29C 59/046 156/209 |
| 4,312,686 A * | 1/1982 | Smith | ........... | B29C 43/305 156/209 |
| 4,589,942 A * | 5/1986 | Korinek | ........... | B32B 37/0007 156/148 |
| 4,605,458 A * | 8/1986 | Nakamura | ........... | B23K 20/04 156/164 |
| 4,612,074 A * | 9/1986 | Smith | ........... | B29C 59/046 156/209 |
| 4,773,959 A * | 9/1988 | Smith | ........... | B29C 59/046 156/220 |
| 4,776,912 A * | 10/1988 | Laval | ........... | B29C 65/02 101/23 |
| 5,087,319 A * | 2/1992 | Held | ........... | B29C 59/046 156/555 |
| 5,118,532 A * | 6/1992 | Batson | ........... | B29C 39/18 427/278 |
| 5,122,212 A * | 6/1992 | Ferguson | ........... | B29C 59/046 156/209 |
| 5,928,762 A * | 7/1999 | Aizawa | ........... | C08L 23/142 428/156 |
| 8,647,556 B2 * | 2/2014 | Swanson | ........... | B65H 26/00 264/447 |
| 2003/0072919 A1 * | 4/2003 | Watts, Jr. | ........... | B32B 3/00 428/203 |
| 2004/0076828 A1 * | 4/2004 | Pierson | ........... | B32B 38/06 428/411.1 |
| 2005/0029704 A1 * | 2/2005 | Wu | ........... | B65D 33/004 264/166 |
| 2005/0051931 A1 * | 3/2005 | Humlicek | ........... | B29C 59/046 264/492 |
| 2005/0077001 A1 * | 4/2005 | Stabile | ........... | B32B 38/004 156/272.2 |
| 2005/0124242 A1 * | 6/2005 | Norvell | ........... | B32B 27/12 442/76 |
| 2005/0173063 A1 * | 8/2005 | Hiramoto | ........... | B32B 41/00 156/324 |
| 2007/0116929 A1 * | 5/2007 | Fujimori | ........... | B32B 27/10 428/156 |
| 2008/0210366 A1 * | 9/2008 | Chen | ........... | B29C 66/727 156/182 |
| 2008/0268203 A1 * | 10/2008 | Blenkhorn | ........... | B05D 1/42 428/141 |
| 2011/0227238 A1 * | 9/2011 | Mimura | ........... | B29D 11/0074 425/371 |
| 2012/0064298 A1 * | 3/2012 | Orr | ........... | B26F 1/26 428/156 |
| 2013/0071589 A1 * | 3/2013 | Hannington | ........... | B32B 27/32 428/35.7 |
| 2013/0228946 A1 * | 9/2013 | Comerio | ........... | B32B 37/203 425/150 |
| 2016/0076182 A1 * | 3/2016 | Strube | ........... | B32B 3/28 28/134 |
| 2017/0210109 A1 * | 7/2017 | Naeyaert | ........... | B32B 27/22 |
| 2018/0117830 A1 * | 5/2018 | Lensing | ........... | B32B 38/1841 |

* cited by examiner

LONG PLASTIC LAYER WITH EMBOSSING IN REGISTER WITH PATTERN AND ROLLING METHOD AND DEVICE THEREFOR

CROSS-REFERENCE TO RELATED APPLICATIONS

This Non-provisional application claims priority under 35 U.S.C. § 119(a) on Patent Application No(s). 201610421191.8 filed in Republic of China on Jun. 15, 2016, the entire contents of which are hereby incorporated by reference.

BACKGROUND OF THE INVENTION

Field of the Invention

The present invention relates to a polyvinyl chloride (PVC) decorative material, and more particularly, to a long plastic layer with an embossing in register with a pattern, and a method and a device for rolling the plastic layer with a continuous length. The decorative material may also be other thermoplastic plastic having stretchability.

Description of the Related Art

Polyvinyl chloride (PVC) decorative material is a new and light floor decorative material that is very popular in the world, especially widely popular in Europe, America, and Japan and Korea in Asia. At present, the material has also been accepted by large and medium-sized cities in domestic and is increasingly applied in families, hospitals, schools, office buildings, factories, supermarkets, airport halls, stadiums, and other sites.

The existing PVC decorative material is usually formed by overlaying a transparent plastic layer on the surface (equivalent to a transparent layer, a protective layer, and a wear-resistant layer), an image plastic layer with a pattern in the middle (equivalent to a printing layer, a decorative layer, and a colored film layer), and a base layer in the bottom (equivalent to a bottom layer and a bottom plate). The PVC decorative material in such a structure may either be directly paved on the floor for use or bonded on the surface of a foam board, a laminated board, or a wood-plastic board to form a composite board. With the continuous development of the market, the decorative requirements of the PVC decorative material are increasingly improved. Users not only expect to process an embossing on the surface of the transparent plastic layer to increase a three-dimensional sense of the flooring, but also expect to make the embossing on the transparent plastic layer in register with the pattern on the image plastic layer (such as a wood grain, a stone grain, or a fabric grain), to make the embossing become the wood grain, stone grain, or fabric grain, thereby further improving the sense of reality and the three-dimensional sense of the PVC decorative material and increasing the simulation effect of the flooring.

A lamination method is a method adopted currently for registering the embossing of the transparent plastic layer with the pattern of the image plastic layer. To make the embossed pattern (the embossing for short) on the surface transparent plastic layer in register with the pattern (such as the wood grain, stone grain, or fabric grain) on the image plastic layer (i.e., the plastic layer printed with continuous unit patterns), the transparent plastic layer, the image plastic layer, and the base layer are firstly tailored into rectangle blocks with the same length, wherein the length shall be the length of one unit pattern on the image plastic layer, and then the transparent plastic layer, the image plastic layer, and the base layer are overlaid together in sequence and are placed on a lower pressing plate. The raised pattern on an upper pressing plate is aligned with the pattern on the image plastic layer through a positioning device, and finally the upper pressing plate is pressed on the transparent plastic layer, heating and pressing. Thus, the embossing pressed on the transparent plastic layer is in register with the pattern of the image plastic layer. The traditional lamination method has great defects: one pressing plate can only press two pieces of pros and cons PVC decorative materials at a time; during mass production, a large number of the pressing plates are required in case of increasing the yield, which leads to high costs and high energy consumption; the pattern on the pressing plate is aligned with the pattern on the image plastic layer, which requires manual operation, resulting in heavy workload and low accuracy rate and causing low production efficiency. Moreover, the length of each piece of the PVC decorative material is fixed, and the patterns of the manufactured flooring are repetitive, which does not comply with the property of natural materials.

U.S. Pat. No. 5,122,212 (filing date is Oct. 27, 1989 and application Ser. No. 07/428,262) discloses a novel improved process for registering the pattern. According to the process, a bottom plate, a decorative layer (transfer printing), and a wear-resistant layer achieve a pattern register effect through a register roller, and during rolling, the pattern on the decorative layer should correspond to the pattern designed on the register roller to press a pattern register effect. The technical solution tries to use a rolling process to improve the traditional lamination method above, so as to register the embossing on the wear-resistant layer with the pattern on the decorative layer. Unfortunately, the technical solution of the patent cannot be applied in practice all the time due to a fatal defect. The fatal defect is that: when the bottom plate, the decorative layer, and the wear-resistant layer are embossed by the register roller synchronously, an longitudinal extension of the decorative layer is unavoidable due to a rolling force and a rolling temperature (over 85° C.), while the grains on the register roller for the embossing will not extend, which will certainly lead to a coincidence deviation between the pattern on the register roller and the pattern on the decorative layer and affect a three-dimensional effect and a simulation effect of the PVC decorative material, so that the product quality cannot be guaranteed. Because the register roller tightly extrudes the decorative layer while embossing, a relative position between the register roller and the decorative layer is tightly pressed by the register roller, which can neither be implemented through adjusting the feeding speed of the printing layer, nor implemented through adjusting the rotating speed of the register roller.

After years of exploration, on May 28, 2003, Chinese Patent Publication No. CN1420025A (application no. is 02149569.6) discloses a Long Floor Decorative Material with Printed Pattern in Register with Embossed Pattern. The patent technology is intended to solve the technical problem that "a printed pattern of a printing layer cannot be in register with an embossed pattern due to transformation (see paragraph 2 in page 5 of the Description)", and this invention "directly uses a glass fiber film made of waterproof stiffener to minimize the transformation of the printed pattern" (see paragraph 2 in page 5 of the Description). Although the method solves the above problem to some degree, the glass fiber film made of waterproof stiffener needs to be added, which increases the process costs and the material costs. The reason why this invention solves the problem to some degree is that once a register deviation exists between the printed pattern of the printing layer and the embossed pattern on the embossing roller along a longitudinal direction during rolling, the patent technology cannot correct the deviation through dynamic adjustment during rolling. Because an embossing roll machine tightly presses the printing layer while embossing, a relative position between the embossing roller and the printing layer cannot be implemented through adjusting the feeding speed of the printing layer and/or adjusting the rotating speed of the embossing roller (having the same defect with that of the U.S. Pat. No. 5,122,212 above).

For decades, those skilled in the art have been keeping exploring an effective way to implement coincidence of the embossing of the transparent plastic layer with the pattern of the image plastic layer, but no breakthrough is achieved. Until now, the coincidence of embossing can only be implemented using the oldest lamination method above in the art.

BRIEF SUMMARY OF THE INVENTION

An objective of the present invention is to provide a rolling method for a long plastic layer with an embossing in register with a pattern, which can implement coincidence between the embossing on a plastic layer and the pattern on a plastic layer and have high production efficiency, low cost and less energy consumption.

Another problem to be solved by the present invention is to provide a rolling device for implementing the rolling method for the long plastic layer with the embossing in register with the pattern, which can be used to process a long plastic layer with the embossing in register with the pattern and have high production efficiency, low cost and less energy consumption.

One more problem to be solved by the present invention is to process the long plastic layer with the embossing in register with the pattern using the foregoing method and device, which has low cost, good simulation effect and un-limited cutting length and complies with the property of a natural material.

To fulfill the foregoing objective, the present invention adopts the following technical solution.

A rolling method for a long plastic layer with an embossing in register with a pattern comprises a feeding step of feeding a plastic layer to be rolled into oppositely rolling rollers, the plastic layer being printed with continuous unit patterns; and a rolling step of hot rolling an embossing on the plastic layer. In the feeding step, a front side of the plastic layer is adjacent to an embossing roller of the oppositely rolling rollers, and an embossed pattern disposed around an outer surface of the cylinder of the embossing roller is corresponding to a pattern of one unit pattern on the plastic layer. A longitudinal deviation of the embossing is adjusted in the rolling step. The adjusting step comprises detecting the longitudinal deviation between the embossed pattern on the embossing roller and the pattern on the plastic layer during rolling and adjusting a feeding tension of the plastic layer according to the longitudinal deviation, so as to adjust a stretching length of the plastic layer before rolling, so that the longitudinal deviation in subsequent rolling is reduced until the embossed pattern is longitudinally in register with the pattern on the plastic layer during rolling.

In an embodiment of the present invention, the adjusting step may comprise detecting a position of a preset part on each unit pattern of the plastic layer and detecting a position of a corresponding part on the embossing roller corresponding to the preset part at the same time; when the preset part is detected to be ahead of the corresponding part, increase the feeding tension of the plastic layer to increase the stretching length of the plastic layer before rolling, so as to reduce an ahead value of the preset part in subsequent rolling until a deviation between the preset part and the corresponding part is zero, so that the embossing hot-rolled on the plastic layer is longitudinally in register with the pattern on the plastic layer; and when the preset part is detected to be lagging behind the corresponding part, decrease the feeding tension of the plastic layer to decrease the stretching length of the plastic layer before rolling, so as to increase a lagged value of the preset part in subsequent rolling until the deviation between the preset part and the corresponding part is zero, so that the embossing hot-rolled on the plastic layer is longitudinally in register with the pattern on the plastic layer.

In an embodiment of the present invention, a spread length of the embossed pattern disposed around the outer surface of the cylinder of the embossing roller may be 1.01 to 1.5 times of the length of one unit pattern on the plastic layer before stretching; and a heating temperature in the rolling step may range from 85° C. to 250° C.

In an embodiment of the present invention, in the rolling step, the longitudinal deviation of the embossing may be measured by a distance difference or a time difference between the detected preset part on each unit pattern of the plastic layer and the detected corresponding part on the embossing roller corresponding to the preset part.

In an embodiment of the present invention, during the process of adjusting the longitudinal deviation of the embossing in the rolling step, a lateral deviation of the image may be further adjusted, and when a lateral deviation is detected to be existing between the pattern on the plastic layer and the embossed pattern on the embossing roller, the plastic layer or the embossing roller may be moved along a lateral direction, so that the pattern on the plastic layer is in register with the embossed pattern around the outer surface of the cylinder of the embossing roller on the lateral direction.

In an embodiment of the present invention, a plastic base layer may be further comprised, the plastic base layer may be delivered to the oppositely rolling rollers simultaneously in the feeding step, and the plastic base layer may be located at a back side of the plastic layer.

A rolling device for implementing the rolling method for the long plastic layer comprises:

a first feeding device for carrying the plastic layer, the oppositely rolling rollers including the embossing roller and a backing roller, and a control device for controlling the first feeding device and the oppositely rolling rollers;

the plastic layer entering the oppositely rolling rollers from the first feeding device; and the front side of the plastic layer being adjacent to the embossing roller. The rolling device further comprises a detecting device for detecting the longitudinal deviation between the embossed pattern on the embossing roller and the pattern on the plastic layer during rolling, and a tension controller disposed on the first feeding device; when the detecting device detects that the longitudinal deviation appears between the embossed pattern on the embossing roller and the pattern on the plastic layer, the control device controls the tension controller to adjust the tension of the plastic layer between the first feeding device and the oppositely rolling rollers according to the longitudinal deviation, so as to adjust the stretching length of the plastic layer before rolling, so that the longitudinal deviation in subsequent rolling is reduced until the embossed pattern is in register with the pattern on the plastic layer during rolling, and the embossing hot-rolled on the plastic layer is longitudinally in register with the pattern on the plastic layer.

In an embodiment of the present invention, the control device may control a heating temperature to be between 85° C. and 250° C. through controlling a hot medium flowing into the oppositely rolling rollers; and a spread length of the embossed pattern disposed around the outer surface of the cylinder of the embossing roller may be 1.01 to 1.5 times of the length a of one unit pattern on the plastic layer before stretching.

In an embodiment of the present invention, the detecting device may comprise a first sensor for detecting a position of a preset part in each unit pattern on the plastic layer and a second sensor for detecting a position of a corresponding part on the embossing roller corresponding to the preset part, the control device may use a distance difference or a time difference of signals detected by the two sensors as the longitudinal deviation of the embossing in the rolling step to control the tension of the first feeding device for feeding in the plastic layer, so as to adjust the stretching length of the plastic layer before rolling, so that the longitudinal deviation in subsequent rolling is reduced until the embossed pattern is longitudinally in register with the pattern on the plastic layer during rolling.

In an embodiment of the present invention, the first sensor may be a color mark sensor or an image sensor, and the second sensor may be a position sensor, a displacement sensor, or a rotation speed sensor.

In an embodiment of the present invention, a magnetic powder brake may be adopted as the tension controller and may be disposed on a feed axle of the first feeding device.

In an embodiment of the present invention, a lateral rectification device may be further comprised, wherein the lateral rectification device may comprise a third sensor for detecting a lateral deviation of the unit pattern on the plastic layer and a lateral transmission device for making the first feeding device move along a lateral direction, and the control device controls the lateral transmission device according to the lateral deviation of the unit pattern on the plastic layer detected by the third sensor, so as to make the first feeding device move along the lateral direction correspondingly, so that the pattern on the plastic layer is in register with the embossed pattern around the outer surface of the cylinder of the embossing roller on the lateral direction.

In an embodiment of the present invention, a second feeding device for feeding a plastic base layer in the oppositely rolling rollers may be further comprised, wherein the plastic base layer may be adjacent to the backing roller and may be hot-rolled to a back side of the plastic layer by the embossing roller and the backing roller.

The long plastic layer with the embossing in register with the pattern manufactured using the rolling method comprises a plastic layer, wherein the embossing hot-rolled on the plastic layer is in register with the pattern on the plastic layer.

In an embodiment of the present invention, a plastic base layer hot-rolled to a back side of the plastic layer may be further comprised.

Compared with the prior art, the present invention has the following beneficial effects. The above-mentioned conventional ways of the prior art are broken by employing the foregoing rolling method for the long plastic layer with the embossing in register with the pattern. In the rolling step, the feeding tension of the plastic layer is adjusted according to the longitudinal deviation between the embossed pattern on the embossing roller and the pattern on the plastic layer, so as to adjust the stretching length of the image plastic layer before rolling, so that the longitudinal deviation in subsequent rolling is reduced until the embossed pattern is in register with the pattern on the plastic layer during rolling, and the embossing hot-rolled on the plastic layer is longitudinally in register with the pattern on the plastic layer. This method can correct the deviation between the embossing and the pattern through the dynamic adjustment during the process of rolling. The processing of registering the embossing on the plastic layer with the pattern on the plastic layer is realized through the rolling method, greatly reducing the production costs and the energy losses, which is a major breakthrough for flooring processing.

After one embossing roller is manufactured, the spread length of the embossed pattern on the outer surface thereof is fixed, so that the spread length of the embossed pattern disposed around the outer surface of the cylinder of the embossing roller is 1.01 to 1.5 times of the length of one unit pattern on the plastic layer before stretching (for a specific embossing roller, the spread length of the embossed pattern disposed around the outer surface thereof is a certain value between 1.01a and 1.5a), so that the pattern on the stretched plastic layer is in register with the embossed pattern on the outer surface of the cylinder of the embossing roller, thereby realizing the embossing on the plastic layer in register with the pattern on the plastic layer.

The present invention has further beneficial effects. According to the rolling device for implementing the rolling method for the long plastic layer, the first feeding device and the oppositely rolling rollers are improved on the basis of the existing device, wherein the tension controller is additionally disposed on the first feeding device, and the detecting device for detecting the longitudinal deviation between the embossed pattern on the embossing roller and the pattern on the plastic layer during rolling is additionally added. When the plastic layer on the first feeding device is mechanically transferred or manually fed to the oppositely rolling rollers, the oppositely rolling rollers will have a tensile force of rolling the plastic layer into the oppositely rolling rollers; when the detecting device detects that the longitudinal deviation appears between the embossed pattern on the embossing roller and the pattern on the plastic layer, the control device controls the tension controller to adjust the tension of the plastic layer between the first feeding device and the oppositely rolling rollers according to the longitudinal deviation, so as to adjust the stretching length of the plastic layer before rolling and adjust the relative position between the oppositely rolling rollers and the plastic layer through the change of the stretching length of the plastic layer, thereby decreasing the longitudinal deviation during the subsequent rolling until the embossed pattern on the embossing roller is in register with the pattern on the plastic layer during rolling. Thus, the embossing hot-rolled on the plastic layer is longitudinally in register with the pattern on the plastic layer. This device can use the rolling method to implement a processing method of registering the embossing of the plastic layer with the pattern of the plastic layer, thereby improving the production efficiency by dozens of times, greatly reducing the production costs and the energy losses, which is a major breakthrough for the flooring processing.

For the long plastic layer with the embossing in register with the pattern manufactured by the rolling method, the embossing hot-rolled on the plastic layer is in register with the pattern on the plastic layer, thereby enhancing the sense of reality and the three-dimensional sense of the decorative material, which improves the simulation effect of the decorative material and has low production cost in unit area and high production efficiency. Moreover, because the long plastic layer is manufactured by the continuous rolling of the oppositely rolling rollers, the length thereof is greater than that of the decorative material processed using the lamination method in the prior art, and the long plastic layer is the decorative material having continuous length (including a plurality of continuous unit patterns). Different cutting positions can be set for such a long plastic layer decorative material having the continuous length, the cutting lengths are not limited, and the patterns of cut blocks are not repetitive. The flooring plank formed by bonding the blocks on the surface of a foaming board, a laminated board, a plastic base layer, or a wood-plastic board complies with the property of a natural material better.

DETAILED DESCRIPTION OF THE INVENTION

Figure 1:
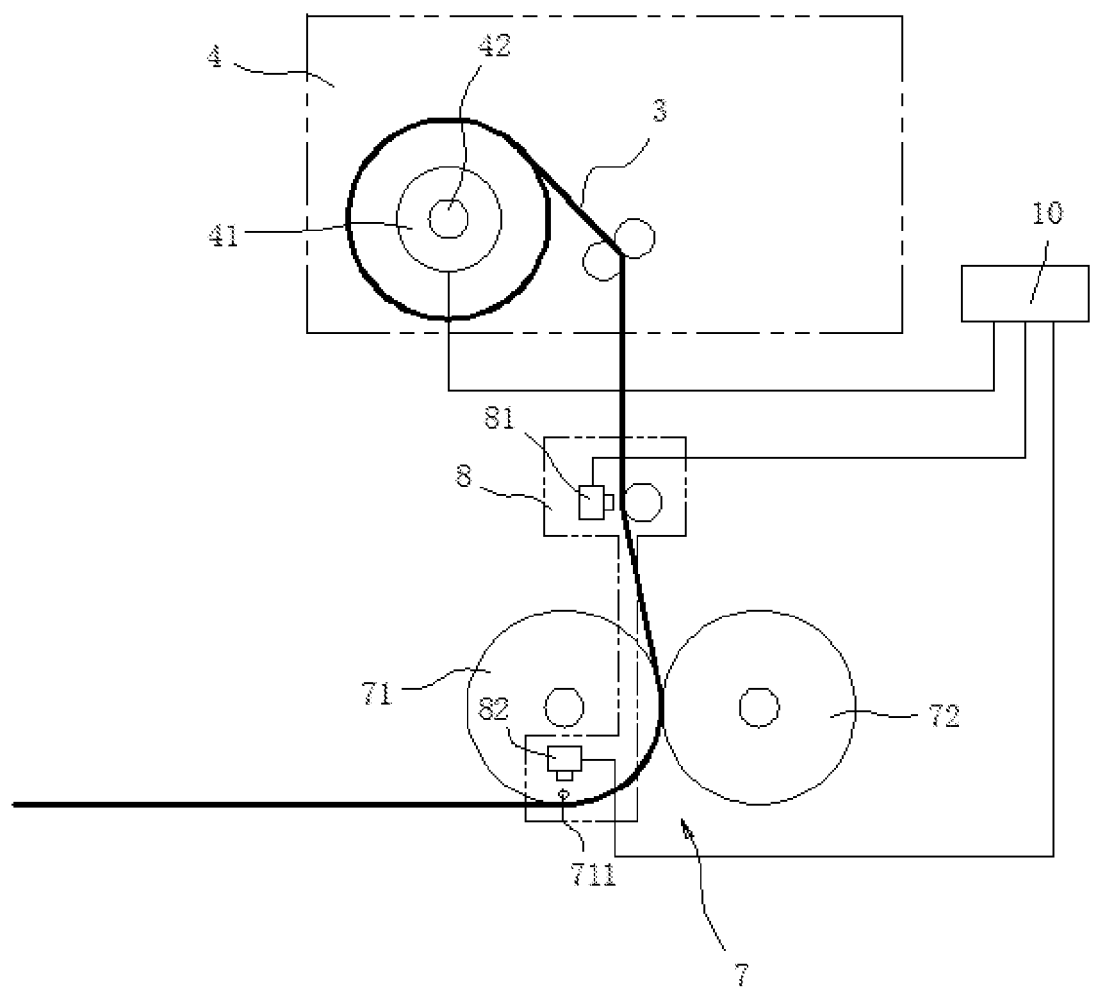
FIG. 1 is a structure diagram of a processing device according to one embodiment of the present invention.
Figure 2:
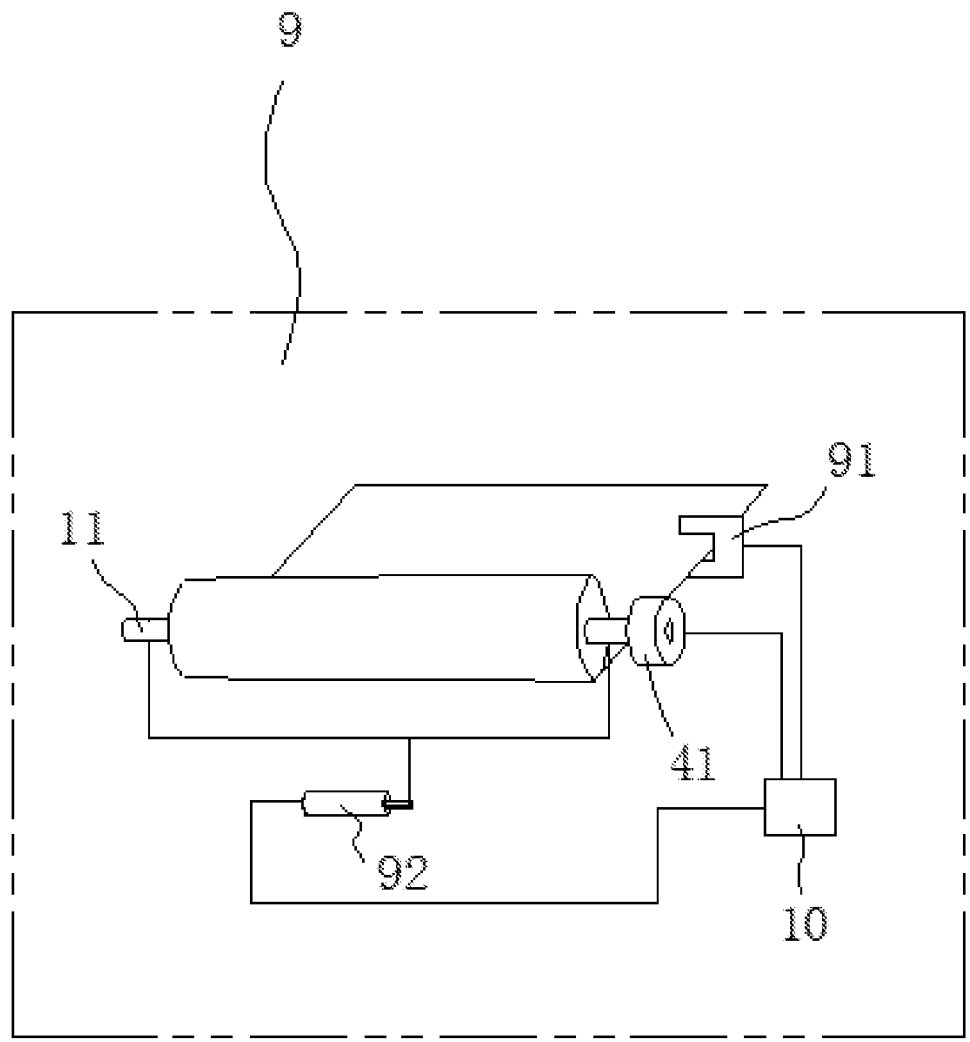
FIG. 2 is a structure diagram of a first feeding device according to one embodiment of the present invention.
Figure 3:
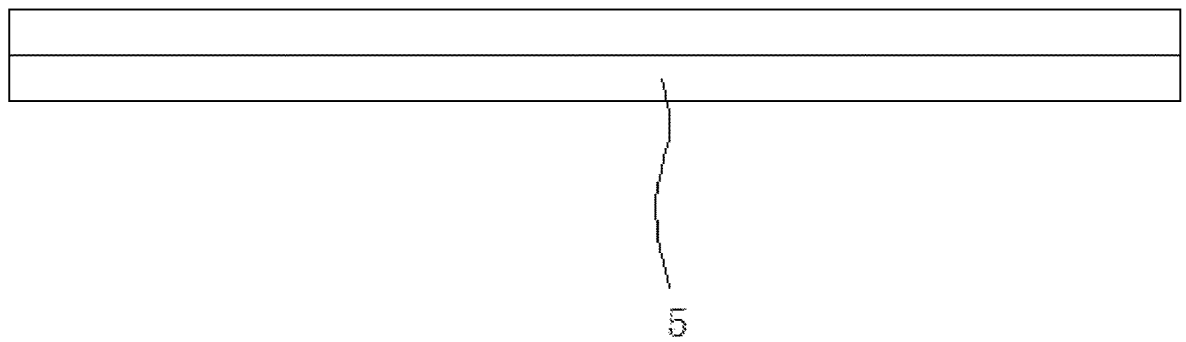
FIG. 3 is a sectional structural diagram of a long plastic layer with an embossing in register with a pattern according to one embodiment of the invention.
Figure 4:
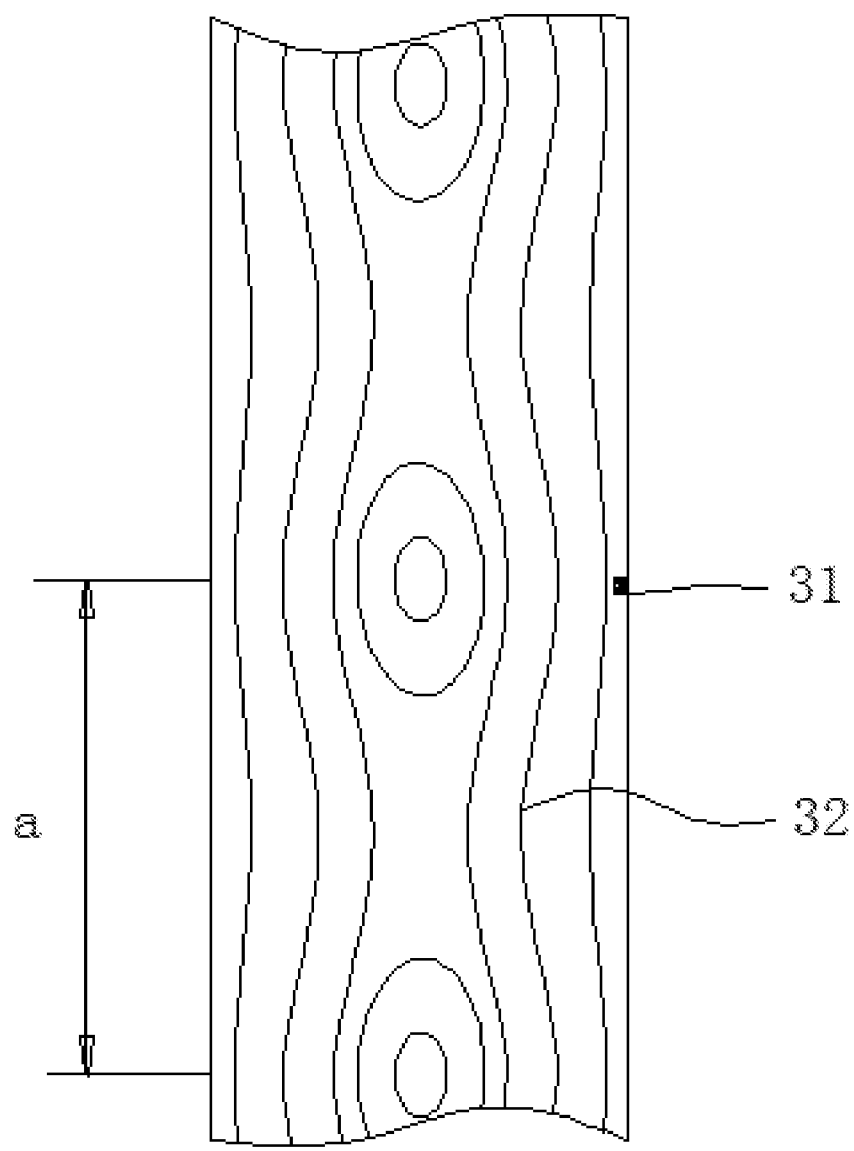
FIG. 4 is a structure diagram of unit patterns connected end to end according to one embodiment of the invention.
Figure 5:
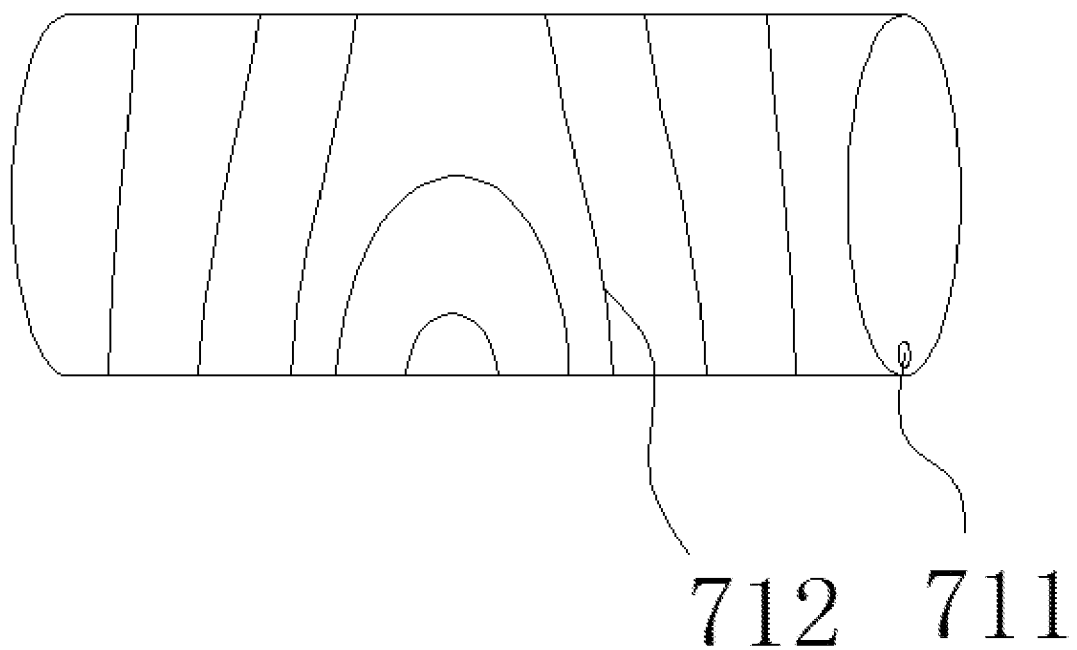
FIG. 5 is a structure diagram of an embossing roller according to one embodiment of the invention.
Figure 6:
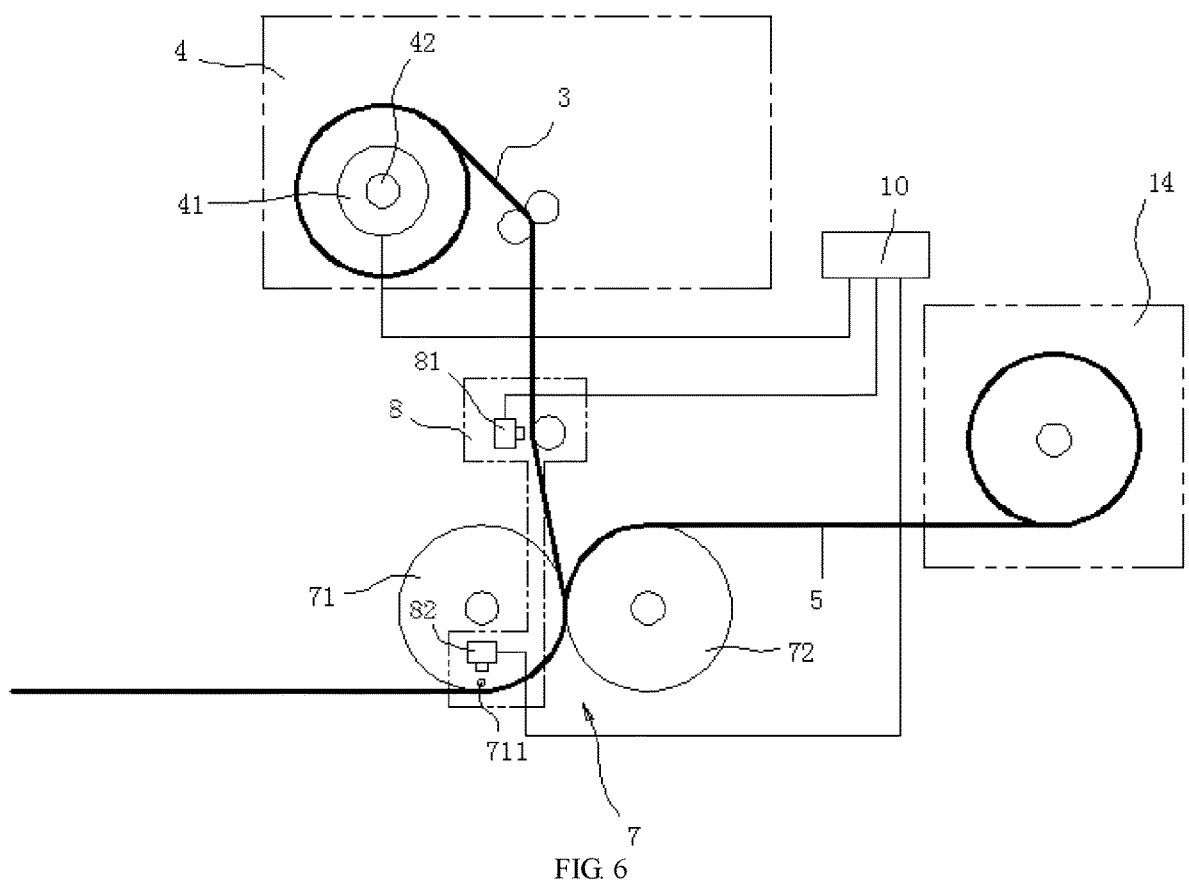
FIG. 6 is a structure diagram of a second feeding device additionally disposed in FIG. 1.

In order to represent the technical solution of the present invention more clearly, the present invention will be explained in details with reference to the accompanying drawings FIG. 1 to FIG. 6 hereinafter. It is to be understood that the detailed embodiments described in the description are only intended to interpret the present invention, rather than to define the protection scope of the present invention.

The present invention relates to a rolling method for a long plastic layer with an embossing in register with a pattern, comprising a feeding step of feeding a plastic layer to be rolled 3 into oppositely rolling rollers 7, the plastic layer 3 being printed with continuous unit patterns; and a rolling step of hot rolling an embossing on the plastic layer 3.

In the feeding step, a front side of the plastic layer 3 is adjacent to an embossing roller 71 of the oppositely rolling rollers 7, and an embossed pattern 712 disposed around an outer surface of the cylinder of the embossing roller 71 is corresponding to a pattern 32 of one unit pattern on the plastic layer 3. Preferably, a spread length of the embossed pattern 712 disposed around the outer surface of the cylinder of the embossing roller 71 is 1.01 to 1.5 times of the length a of one unit pattern on the plastic layer 3 before stretching. In a lateral direction, the width of the plastic layer 3 changes little after the stretching, and a deviation of the embossing in a width direction is hard to be visually noticed and can be neglected. Preferably, the width of the embossed pattern 712 on the outer surface of the cylinder of the embossing roller 71 is 0.95-1 times of the width of the unit pattern on the plastic layer 3 before stretching.

In the rolling step, a longitudinal deviation of the embossing is adjusted. First, the longitudinal deviation between the embossed pattern 712 on the embossing roller 71 and the pattern 32 on the plastic layer 3 during rolling is detected, and a feeding tension of the plastic layer 3 is adjusted according to the longitudinal deviation, so as to adjust a stretching length of the plastic layer 3 before rolling, so that the longitudinal deviation in subsequent rolling is reduced until the embossed pattern 712 is longitudinally in register with the pattern 32 on the plastic layer 3 during rolling.

The longitudinal deviation of the embossing is measured by a distance difference or a time difference between a detected preset part 31 on each unit pattern of the plastic layer 3 and a detected corresponding part 711 on the embossing roller 71 corresponding to the preset part 31. Preferably, the adjusting step includes detecting a position of the preset part 31 on each unit pattern of the plastic layer 3 and detecting a position of the corresponding part 711 on the embossing roller 71 corresponding to the preset part 31 at the same time. When the preset part 31 is detected to be ahead of the corresponding part 711, increase the feeding tension of the plastic layer 3 to increase the stretching length of the plastic layer 3 before rolling, so as to reduce an ahead value of the preset part 31 in subsequent rolling until the deviation between the preset part 31 and the corresponding part 711 is zero, so that the embossing hot-rolled on the plastic layer 3 is longitudinally in register with the pattern 32 on the plastic layer 3. When the preset part 31 is detected to be lagging behind the corresponding part 711, decrease the feeding tension of the plastic layer 3 to decrease the stretching length of the plastic layer 3 before rolling, so as to increase a lagged value of the preset part 31 in the subsequent rolling until the deviation between the preset part 31 and the corresponding part 711 is zero, so that the embossing hot-rolled on the plastic layer 3 is longitudinally in register with the pattern 32 on the plastic layer 3. Certainly, the register mentioned herein refers to register in a deviation range hard to be visually noticed, for example, the deviation is 0-2 mm and is preferably 0-0.5 mm.

Preferably, a heating temperature in the rolling step ranges from 85° C. to 250° C.

During the process of adjusting the longitudinal deviation of the embossing in the rolling step, a lateral deviation of the pattern is further adjusted. When the lateral deviation is detected to be existing between the pattern 32 on the plastic layer 3 and the embossed pattern 712 on the embossing roller 71, the plastic layer 3 or the embossing roller 71 is moved along a lateral direction, so that the pattern 32 on the plastic layer is in register with the embossed pattern 712 around the outer surface of the cylinder of the embossing roller 71 on the lateral direction.

The plastic layer 3 may either be a transparent plastic layer, or a non-transparent plastic layer. When the plastic layer is a transparent plastic layer, the continuous unit patterns may either be printed in the front side or the back side of the transparent plastic layer; and when the plastic layer is a non-transparent plastic layer, the continuous unit patterns are printed in the front side of the transparent plastic layer.

Further preferably, the plastic layer 3 further comprises a plastic base layer 5. The plastic base layer 5 is delivered to the oppositely rolling rollers 7 simultaneously in the feeding step, and the plastic base layer 5 is located at the back side of the plastic layer 3.

A rolling device for implementing the rolling method for the long plastic layer comprises: a first feeding device 4 for carrying the plastic layer 3, the oppositely rolling rollers 7 including the embossing roller 71 and a backing roller 72, a control device 10 for controlling the first feeding device 4 and the oppositely rolling rollers 7, a detecting device 8 for detecting the longitudinal deviation between the embossed pattern 712 on the embossing roller 71 and the pattern 32 on the plastic layer 3 during rolling, and a tension controller 41 disposed on the first feeding device 4.

The plastic layer 3 enters the oppositely rolling rollers 7 from the first feeding device 4, and the front side of the plastic layer 3 is adjacent to the embossing roller 71. As described in the foregoing rolling method for the long plastic layer, the embossed pattern 712 disposed around the outer surface of the cylinder of the embossing roller 71 is corresponding to the pattern 32 of one unit pattern on the plastic layer 3. Preferably, the spread length of the embossed pattern 712 disposed around the outer surface of the cylinder of the embossing roller 71 is 1.01 to 1.5 times of the length a of one unit pattern on the plastic layer 3 before stretching. When the plastic layer 3 on the first feeding device 4 is mechanically transferred or manually fed to the oppositely rolling rollers 7, the oppositely rolling rollers 7 will have a tensile force of rolling the plastic layer 3 into the oppositely rolling rollers 7. When the detecting device 8 detects that the longitudinal deviation appears between the embossed pattern 712 on the embossing roller 71 and the 32 on the plastic layer 3, the control device 10 controls the tension controller 41 to adjust the tension of the plastic layer 3 between the first feeding device 4 and the oppositely rolling rollers 7 according to the longitudinal deviation, so as to adjust the stretching length of the plastic layer 3 before rolling, thereby decreasing the longitudinal deviation during the subsequent rolling until the embossed pattern 712 is in register with the pattern 32 on the plastic layer 3 during rolling. Thus, the embossing hot-rolled on the plastic layer 3 is longitudinally in register with the pattern 32 on the plastic layer 3. Preferably, the detecting device comprises a first sensor 81 for detecting the position of the preset part 31 in each unit pattern on the plastic layer 3 and a second sensor 82 for detecting the position of the corresponding part 711 on the embossing roller 71 corresponding to the preset part 31. The control device 10 uses a distance difference or a time difference of signals detected by the two sensors 81 and 82 as the longitudinal deviation of the embossing in the rolling step to control the tension of the first feeding device 4 for feeding in the plastic layer 3, so as to adjust the stretching length of the plastic layer 3 before the rolling, so that the longitudinal deviation in the subsequent rolling is reduced until the embossed pattern 712 is longitudinally in register with the pattern 32 on the plastic layer 3 during rolling. Preferably, the first sensor 81 is a color mark sensor or an image sensor, and the second sensor 82 is a position sensor, a displacement sensor, or a rotation speed sensor. A magnetic powder brake is adopted as the tension controller 41, and is disposed on a feed axle 42 of the first feeding device 4.

The preset part 31 is preferably a partial pattern of a certain part on each unit pattern of the plastic layer 3 or is preferably a chromatic printing line (may either be a black chromatic line, or a color chromatic line in other colors) at the side of the plastic layer 3. A color mark sensor is adopted as the first sensor 81, the corresponding part 711 is a magnetic block disposed at an end face of the embossing roller 71, and a Hall sensor is adopted as the second sensor 82. The embossed pattern 712 on the embossing roller 71 corresponding to the magnetic block is corresponding to the pattern on the plastic layer 3 corresponding to the preset part 31.

In the lateral direction, the width of the plastic layer 3 changes little after the stretching, and the deviation of the embossing in the width direction is hard to be visually noticed and can be neglected. Preferably, the width of the embossed pattern 712 on the outer surface of the cylinder of the embossing roller 71 is 0.95-1 times of the width of the unit pattern on the plastic layer 3 before stretching. To prevent the plastic layer 3 from deviation during feeding, a lateral rectification device 9 may be disposed. The lateral rectification device 9 includes a third sensor 91 for detecting a lateral deviation of the unit pattern on the plastic layer 3 and a lateral transmission device 92 for making the first feeding device 4 move along the lateral direction. The control device 10 controls the lateral transmission device 92 according to the lateral deviation of the unit pattern on the plastic layer 3 detected by the third sensor 91, so as to make the first feeding device 4 move along the lateral direction correspondingly, so that the pattern 32 on the plastic layer 3 is in register with the embossed pattern 712 around the outer surface of the cylinder of the embossing roller 71 on the lateral direction. During practical application, a second feeding device 14 for feeding a plastic base layer 5 in the oppositely rolling rollers 7 may also be additionally disposed. The plastic base layer 5 is adjacent to the backing roller 72 and is hot-rolled on the back side of the plastic layer 3 by the embossing roller 71 and the backing roller 72.

The long plastic layer with the embossing in register with the pattern manufactured using the foregoing rolling method comprises the plastic layer 3, and the embossing hot-rolled on the plastic layer 3 is in register with the pattern 32 on the plastic layer 3. Preferably, the long plastic layer 3 further comprises a plastic base layer 5 hot-rolled to the back side of the plastic layer 3.

The long plastic layer according to the foregoing technical solutions may either be bonded on the surface of a foaming board, a laminated board, or a wood-plastic board to form a composite board, or be hot-pressed together with the plastic base layer 5 and then is directly paved on a floor for use.

The plastic layer and the plastic base layer according to the foregoing solutions of the present invention refer to a PVC material layer, and certainly may also refer to other thermoplastic layer with stretchability or other materials having similar functions.

What is claimed is:

1. A rolling method for producing a long plastic layer with an embossing in register with a pattern, comprising:
    a feeding step of feeding a plastic layer to be rolled into oppositely rolling rollers by a feeding roller, the plastic layer being printed with repeating unit patterns; and
    a rolling step of hot rolling an embossing on the plastic layer;
    in the feeding step, a front side of the plastic layer being adjacent to an embossing roller formed by one of the oppositely rolling rollers, and an embossed pattern disposed around an outer surface of a cylinder of the embossing roller corresponding to a pattern of one unit pattern on the plastic layer,
    wherein a longitudinal deviation of the embossing is adjusted in the rolling step, an adjusting step comprises:
    detecting the longitudinal deviation between the pattern on the plastic layer and the embossed pattern on the embossing roller by sensing a position of a preset part in each unit pattern on the already stretched plastic layer after the feeding roller and prior to entering the oppositely rolling rollers, and detecting a position of a corresponding part directly on the embossing roller corresponding to the preset part prior to embossing, and adjusting a feeding tension of the plastic layer according to the longitudinal deviation, so as to adjust a stretching length of the plastic layer between the feeding roller in the feeding step and the oppositely rolling rollers in the rolling step before rolling and thereby embossing, so that the longitudinal deviation in subsequent rolling is reduced until the embossed pattern is longitudinally in register with the pattern on the plastic layer during rolling, wherein the registering of the embossing on the plastic layer and the pattern on the plastic layer is realized during the rolling by the embossing roller; and wherein the feeding roller only feeds the plastic layer into the oppositely rolling rollers;

wherein the method further comprises the step of controlling the heating temperature of the oppositely rolling rollers by a control device, the control device controlling a hot medium flowing into the oppositely rolling rollers.

2. The rolling method for producing the long plastic layer according to claim 1, wherein the adjusting step comprises detecting a position of a preset part on each unit pattern of the plastic layer and detecting a position of a corresponding part on the embossing roller corresponding to the preset part at the same time; when the preset part is detected to be ahead of the corresponding part, increase the feeding tension of the plastic layer to increase the stretching length of the plastic layer before rolling, so as to reduce an ahead value of the preset part in subsequent rolling until a deviation between the preset part and the corresponding part is zero, so that the embossing controlled on the plastic layer is longitudinally in register with the pattern on the plastic layer;

and when the preset part is detected to be lagging behind the corresponding part, decrease the feeding tension of the plastic layer to decrease the stretching length of the plastic layer before rolling, so as to increase a lagged value of the preset part in the subsequent rolling until the deviation between the preset part and the corresponding part is zero, so that the embossing hot-rolled on the plastic layer is longitudinally in register with the pattern on the plastic layer.

3. The rolling method for producing the long plastic layer according to claim 1, wherein a heating temperature in the rolling step ranges from 85° C. to 250° C.

4. The rolling method for producing the long plastic layer according to claim 1, wherein in the rolling step, the longitudinal deviation of the embossing is measured by a distance difference or a time difference between a detected preset part on each unit pattern of the plastic layer and a detected corresponding part on the embossing roller corresponding to the preset part.

5. The rolling method for producing the long plastic layer according to claim 1, wherein during the process of adjusting the longitudinal deviation of the embossing in the rolling step, a lateral deviation of the pattern is adjusted, and when a lateral deviation is detected to be existing between the pattern on the plastic layer and the embossed pattern on the embossing roller, the plastic layer or the embossing roller is moved along a lateral direction, so that the pattern on the plastic layer is in register with the embossed pattern around the outer surface of the cylinder of the embossing roller on the lateral direction.

6. A rolling method for producing a long plastic layer with an embossing in register with a pattern, comprising:

a feeding step of feeding a plastic layer to be rolled into oppositely rolling rollers by a feeding roller, the plastic layer being printed with repeating unit patterns; and a rolling step of hot rolling an embossing on the plastic layer;

in the feeding step, a front side of the plastic layer being adjacent to an embossing roller formed by one of the oppositely rolling rollers, and an embossed pattern disposed around an outer surface of a cylinder of the embossing roller corresponding to a pattern of one unit pattern on the plastic layer, wherein a longitudinal deviation of the embossing is adjusted in the rolling step, an adjusting step comprises:

detecting the longitudinal deviation between the pattern on the plastic layer and the embossed pattern on the embossing roller by sensing a position of a preset part in each unit pattern on the already stretched plastic layer after the feeding roller and prior to entering the oppositely rolling rollers, and detecting a position of a corresponding part directly on the embossing roller corresponding to the preset part prior to embossing, and wherein said detecting is of a distance difference or a time difference of signals detected by a first sensor for detecting the position of a preset part and a second sensor for detecting the position of a corresponding part, and adjusting a feeding tension of the plastic layer according to the longitudinal deviation, so as to adjust a stretching length of the plastic layer between the feeding roller in the feeding step and the oppositely rolling rollers in the rolling step before rolling and thereby embossing, so that the longitudinal deviation in subsequent rolling is reduced until the embossed pattern is longitudinally in register with the pattern on the plastic layer during rolling, wherein the registering of the embossing on the plastic layer and the pattern on the plastic layer is realized during the rolling by the embossing roller; and wherein the feeding roller only feeds the plastic layer into the oppositely rolling rollers;

wherein the method further comprises the step of controlling the heating temperature of the oppositely rolling rollers by a control device controlling a hot medium flowing into the oppositely rolling rollers.

7. The rolling method for producing the long plastic layer according to claim 6, wherein a heating temperature in the rolling step ranges from 85° C. to 250° C.

8. The rolling method for producing the long plastic layer according to claim 1, wherein the adjusting the feeding tension only uses mechanical tensioning to adjust the feeding tension.

9. The rolling method for producing the long plastic layer according to claim 1, said feeding step of feeding a plastic layer comprises unwinding said plastic layer from a roll mounted on a feeding axle, wherein said feeding axle is provided with a tension controller, wherein said adjusting a feeding tension of the plastic layer is at least performed by means of adjusting said tension controller of said feeding axle.

10. The rolling method for producing the long plastic layer according to claim 6, said feeding step of feeding a plastic layer comprises unwinding said plastic layer from a roll mounted on a feeding axle, wherein said feeding axle is provided with a tension controller, wherein said adjusting a feeding tension of the plastic layer is at least performed by means of adjusting said tension controller of said feeding axle.

11. The rolling method for producing the long plastic layer according to claim 1, comprising a single pair of oppositely rolling rollers, the oppositely rolling rollers configured to emboss the plastic layer.

12. The rolling method for producing the long plastic layer according to claim 1, further comprising the step of arranging a spread length of the embossed pattern disposed around the outer surface of a cylinder of the embossing roller is 1.0 to 1.5 times of a length of the one unit pattern on the plastic layer before stretching.

13. The rolling method for producing the long plastic layer according to claim 6, further comprising the step of arranging a spread length of the embossed pattern disposed around the outer surface of a cylinder of the embossing roller is 1.0 to 1.5 times of a length of the one unit pattern on the plastic layer before stretching.

* * * * *